(12) United States Patent
Aldrich et al.

(10) Patent No.: US 8,593,073 B2
(45) Date of Patent: Nov. 26, 2013

(54) APPARATUS AND METHODS FOR INTERACTIVE ILLUMINATION

(75) Inventors: Matthew Aldrich, Cambridge, MA (US); Mark Feldmeier, Waukesha, WI (US); Joseph Paradiso, Medford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 292 days.

(21) Appl. No.: 12/905,968

(22) Filed: Oct. 15, 2010

(65) Prior Publication Data

US 2011/0089842 A1  Apr. 21, 2011

Related U.S. Application Data

(60) Provisional application No. 61/252,123, filed on Oct. 15, 2009.

(51) Int. Cl.
*H05B 37/00* (2006.01)

(52) U.S. Cl.
USPC .......................................... 315/291; 315/312

(58) Field of Classification Search
USPC ............. 315/291, 307, 292, 185 R, 192, 247, 315/312, 293, 317, 318, DIG. 4
See application file for complete search history.

(56) References Cited

U.S. PATENT DOCUMENTS

| | | | |
|---|---|---|---|
| 7,394,210 B2* | 7/2008 | Ashdown ....................... | 315/291 |
| 7,397,205 B2* | 7/2008 | Huang et al. .................. | 315/360 |
| 2006/0068683 A1* | 3/2006 | Sudo ................................ | 451/5 |
| 2008/0103714 A1 | 5/2008 | Aldrich et al. | |
| 2008/0157698 A1* | 7/2008 | Tan et al. ....................... | 315/294 |
| 2008/0203928 A1* | 8/2008 | Frumau et al. ................. | 315/151 |

OTHER PUBLICATIONS

Miki, M., Amamiya, A., Hiroyasu, T.: Distributed optimal control of lighting based on stochastic hill climbing method with variable neighborhood. In: Systems, Man and Cybernetics, 2007. ISIC. IEEE International Conference on. pp. 1676-1680. IEEE (2007).

Mozer, M.: The neural network house: An environment that adapts to its inhabitants. In: Proc. AAAI Spring Symp. Intelligent Environments (1998).

Pan, M.S., Yeh, L.W., Chen, Y.A., Lin, Y.H., Tseng, Y.C.: Design and implementation of a wsn-based intelligent light control system. Distributed Computing Systems Workshops, International Conference on 0, 321-326 (2008).

(Continued)

*Primary Examiner* — Minh D A
(74) *Attorney, Agent, or Firm* — Stephen R. Otis

(57) ABSTRACT

In illustrative implementations of this invention, a lighting system comprises a plurality of LEDs, fluorescent lights, incandescent lights, a processor, a sensor node and a human-computer interface. The sensor is adapted to be moved by a user and placed in the location that a user wants to illumine. The LED lights are adapted to emit pulse-width modulated (PWM) light, controlled by signals from the processor. The lighting system is adapted to optimize parameters (such as efficacy or color rendering index) selected by the user, subject to certain constraints (such as desired illuminance or color temperature). According to principles of this invention, if a sensor is moved, attenuation may be measured and the inverse square law may be used to determine how constraints in an optimization algorithm need to be updated.

20 Claims, 15 Drawing Sheets

(56) References Cited

OTHER PUBLICATIONS

Park, H., Burke, J., Srivasta, M.B.: Design and implementation of a wireless sensor network for intelligent light control. In: Proceedings of the 6th international conference on Information processing in sensor networks. pp. 370-379. IPSN'07, ACM (2007).

Schubert, E.F., Kim, J.K.: Solid-state light sources getting smart. Science 308 (5726), 1274-1278 (2005).

Wen, Y.J., Granderson, J., Agogino, A.M.: Towards embedded wireless-networked intelligent daylighting systems for commercial buildings. In: Proceedings of the IEEE International Conference on Sensor Networks, Ubiquitous, and Trustworthy Computing. Proc. IEEE, vol. 1, pp. 326-331. IEEE Computer Society (2006).

* cited by examiner

US 8,593,073 B2

APPARATUS AND METHODS FOR INTERACTIVE ILLUMINATION

RELATED APPLICATIONS

This application claims the benefit of U.S. Provisional Application Ser. No. 61/252,123, filed Oct. 15, 2009, the entire disclosure of which is herein incorporated by reference.

FIELD OF THE TECHNOLOGY

The present invention relates generally to lighting.

SUMMARY

In exemplary embodiments of this invention:

A lighting system provides illumination that is targeted in time (e.g., when a user is present) and space (e.g., lighting a particular area in which a user is then interested). For example, the system may primarily light an area of a room where a user is located, or in some implementations, an area at which a user is looking or has otherwise selected. Such targeted lighting may be used to advantage to greatly reduce power consumption, compared to a conventional lighting system.

The system employs light-emitting diodes (LEDs) for at least some of the lighting. This is advantageous, because LEDS are generally more energy efficient than incandescent or fluorescent lights.

For example, the system may comprise several LD lights, a fluorescent light, an incandescent light, a sensor unit, and at least one processor. Natural light may enter the room through a window.

The sensor unit may comprise a variety of different types of light sensors (such as analog linear sensors, digital intensity and color sensors, and visible light blocking phototransistors) and a human-computer interface.

The system may be highly configurable: It may allow a user to optimize parameters such as efficacy (lumens produced/watts consumed, a measure of how much power the system uses to produce a certain amount of light) or the color rendition index, or "CRI". CRI is a measure of the degree to which a light source makes an object appear the same color as it would under natural light. To optimize a parameter means to minimize it or maximize it, as the case may be. For example, to optimize efficacy means to maximize it.

The optimization may be subject to certain constraints, such as that a user desires a certain level of illuminance or a certain color temperature.

When optimizing, one or more processors calculate how to adjust the outputs of the respective light sources to maximize or minimize the chosen parameter. In some cases, this involves adjusting some lights differently from other lights.

In order to calculate how to adjust the respective outputs of the various light fixtures (to achieve optimization of a parameter), it is helpful to know how much each light fixture respectively is presently contributing to the total incident light intensity at a particular position. According to principles of this invention, a variety of approaches may be used to determine these respective contributions. For example, these respective contributions may be estimated by using approaches that involve: (a) measuring infrared (IR) irradiance and using that measurement to estimate visible light illuminance, (b) mixing a high frequency carrier wave with PWM light and measuring the amplitude of the received carrier wave, (c) taking light sensor measurements while varying the emitted intensity of a subset of the LED light sources by a known percentage, and (d) superimposing light maps of reflected light (which have been captured by a camera or other light sensor).

This invention may be implemented with either linear or non-linear optimization techniques.

It is highly desirable for a lighting system to respond in real time to changes. For example, a user may change position in a room, and the primary area of illuminance may need to move with the user. Or a user may input a changed preference regarding level of illumination. Advantageously, this invention may be implemented in such a way that it responds in real time to such changes.

According to principles of this invention, after a sensor has been moved relative to a light source, constraints in an optimization algorithm relating to the position of the sensor may be updated by taking a new measure of incident intensity at the new position, calculating attenuation (by comparing that measurement to a reference value for incident intensity at a known distance from the light source), and using the inverse square law to calculate changes in constraints of the optimization algorithm. This approach may dramatically reduce computational complexity (and thereby facilitate real time response of the system).

As used herein, "attenuation" means the attenuation of light according to the inverse square law.

The above description of the present invention is just a summary. It is intended only to give a general introduction to some illustrative implementations of this invention. It does not describe all of the details of this invention. This invention may be implemented in many other ways.

The above Figures illustrate some illustrative implementations of this invention, or provide information that relates to those implementations. However, this invention may be implemented in many other ways. The above Figures do not show all of the details of this invention.

DETAILED DESCRIPTION

Figure 1:
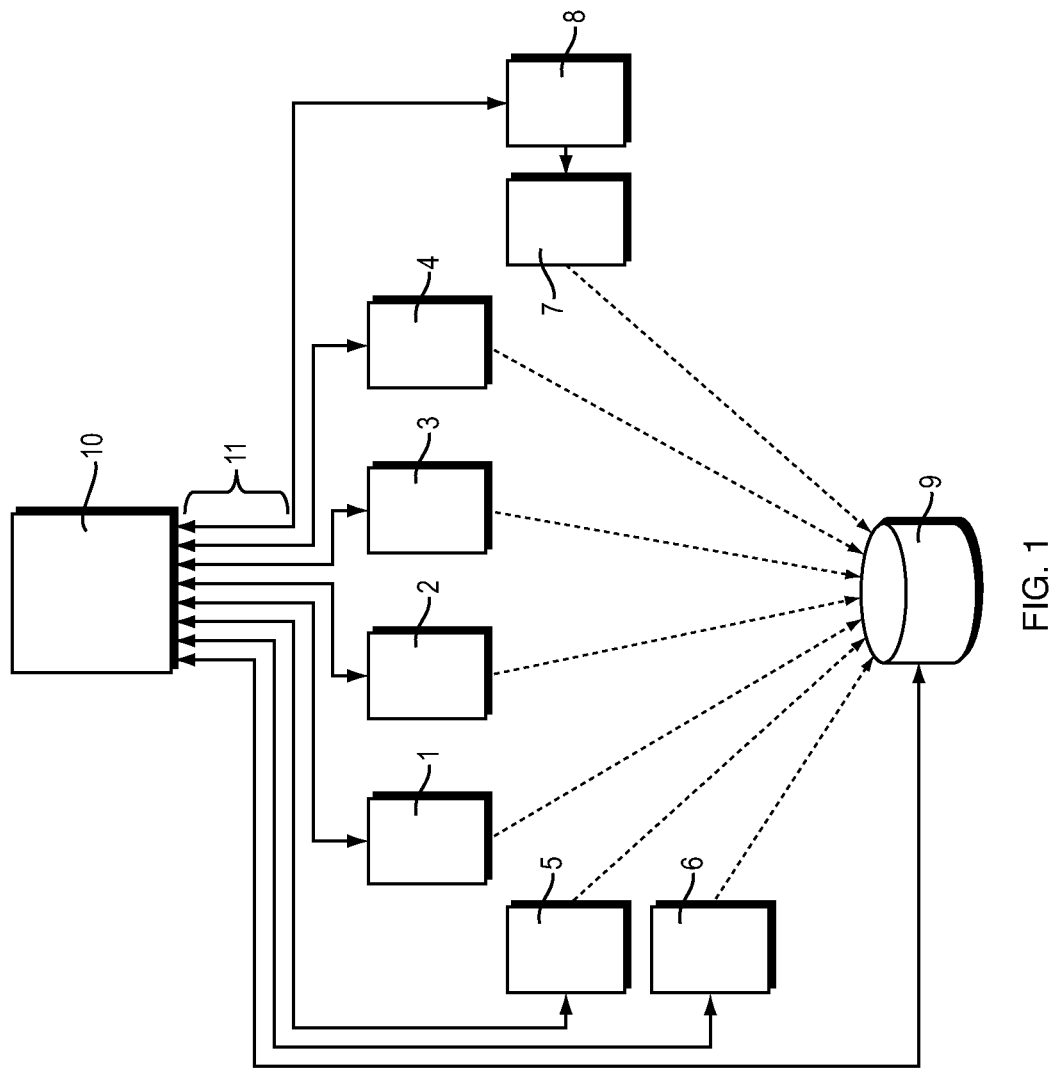
FIG. 1 is a block diagram of an illustrative implementation of this invention.

FIG. 1 is a block diagram of an illustrative implementation of this invention. In FIG. 1, lighting for a room is provided by four LED light sources 1, 2, 3, 4, an incandescent light source 5, a fluorescent light source 6 and a window 7 through which natural light enters. Light from each of these light sources reaches a sensor unit 9. A processor 10 is connected by wired or wireless connections 11 with the artificial light sources 1, 2, 3, 4, 5, 6, 7 and with an actuator 8 that controls a window shade for adjusting the amount of natural light entering the room through the window 7. A processor 10 processes data received from the sensor unit 9 and outputs instructions for controlling the artificial light sources as well as the actuator 8 that moves the window shade.

Figure 2:
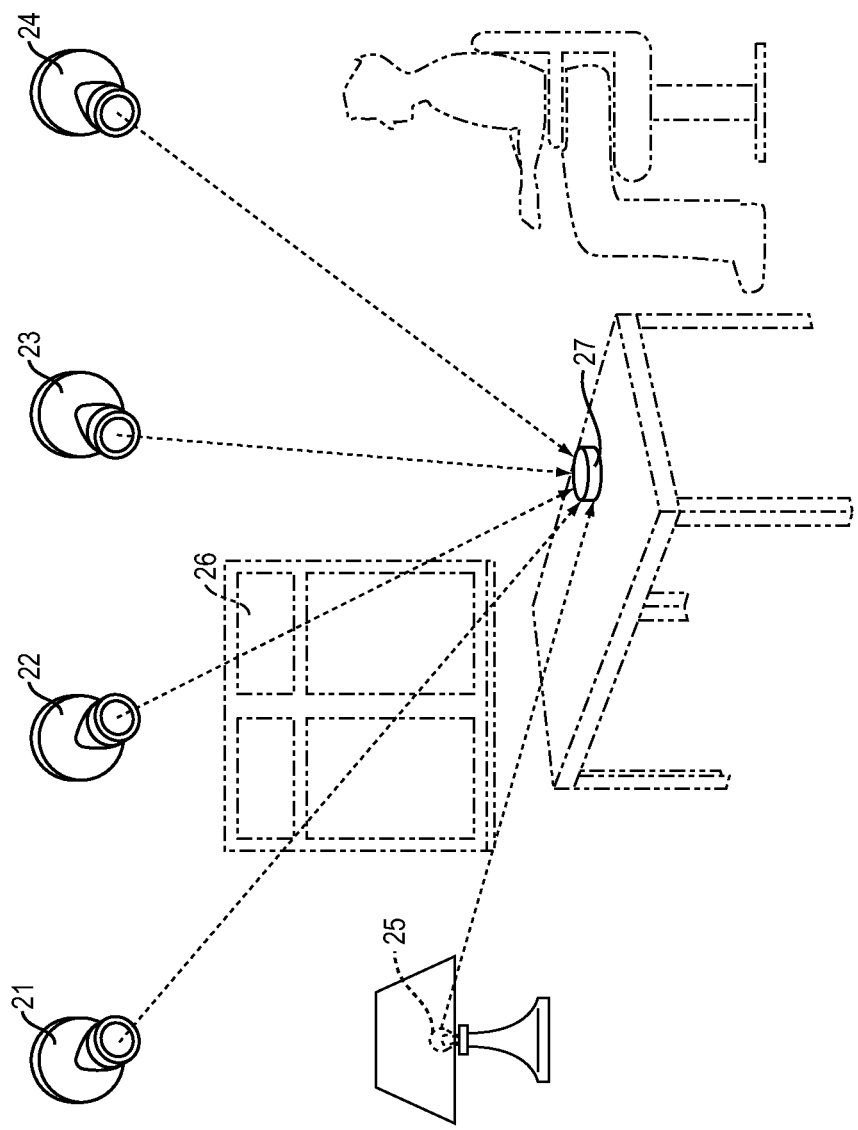
FIG. 2 shows the use of a sensor "puck", in an illustrative implementation of this invention.
Figure 3:
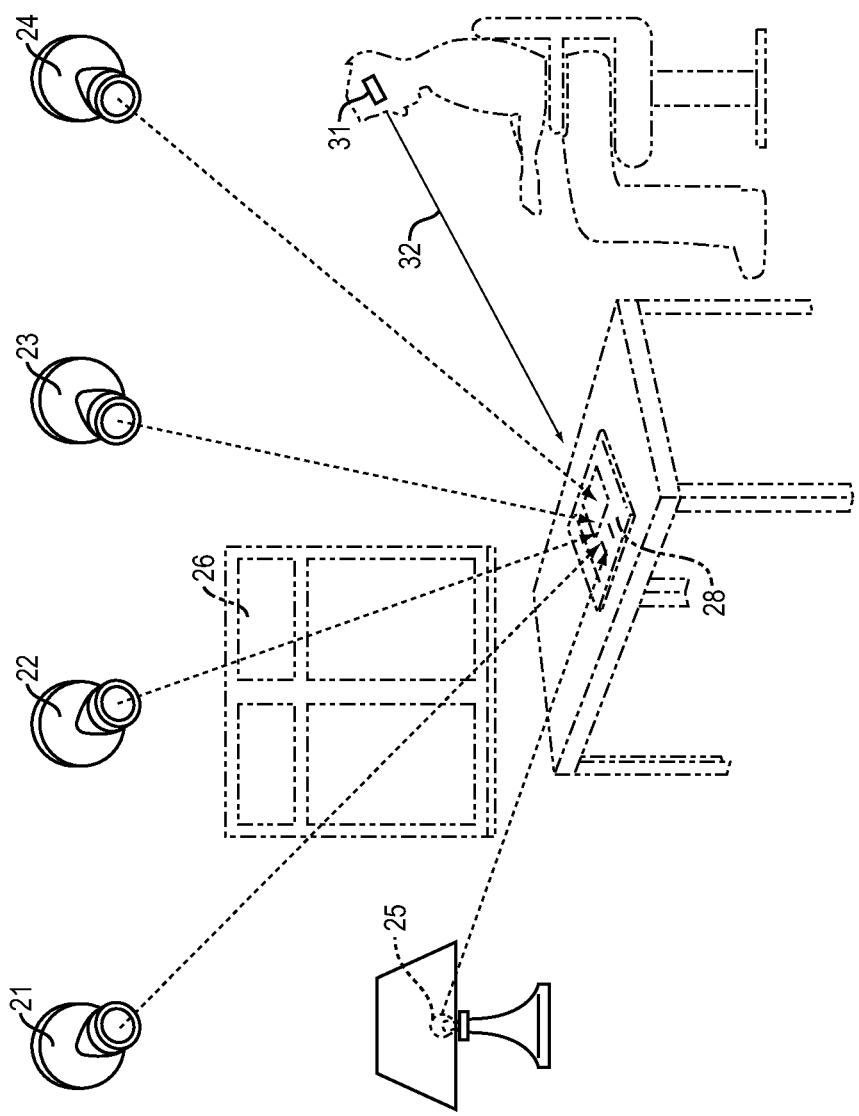
FIG. 3 shows a wearable light sensor aligned along a user's line of sight, in an illustrative implementation of this invention.

FIGS. 2 and 3 show other implementations of this invention. In FIGS. 2 and 3, four LED light sources 21, 22, 23 and 24 provide illumination and are controlled by a processor (not shown). Two uncontrolled light sources are present: an incandescent light 25 and natural light that enters through a window 26.

In FIG. 2, a sensor unit (also called a "puck") 27 measures the total illuminance from these light sources that is incident at the puck. The puck 27 is adapted to be easily carried by a human user. The user places the puck in an area that the user wants to be illuminated. The puck includes a human-computer interface ("HCI") that allows the user to select a desired level of illuminance and a desired color temperature. The HCI also allows the user to select whether to optimize the lighting system for efficacy or color temperature.

In FIG. 3, a user wears a directed optical sensor 31 that captures an image of the scene in the user's line of sight. In the example shown in FIG. 3, the scene being viewed by the user (and captured by the sensor) comprises a newspaper 28 on a table. The sensor captures light reflected from that scene.

Figure 4:
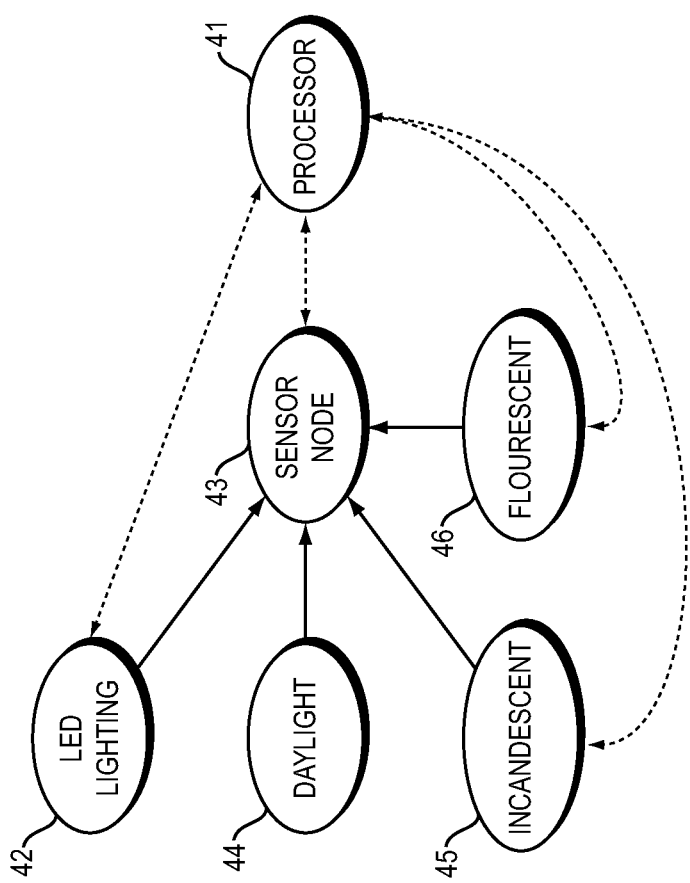
FIG. 4 shows high-level system architecture, in an illustrative implementation of this invention.

FIG. 4 is a block diagram that illustrates high-level system architecture, in an illustrative implementation of this invention. A sensor 43 measures light incident on the sensor. That light includes illumination from LED lighting 43, incandescent 45 and fluorescent 46 light sources and daylight 44. A processor 41 receives data from a sensor node 43 and outputs instructions to control the artificial light sources 42, 44, 46.

Figure 5:
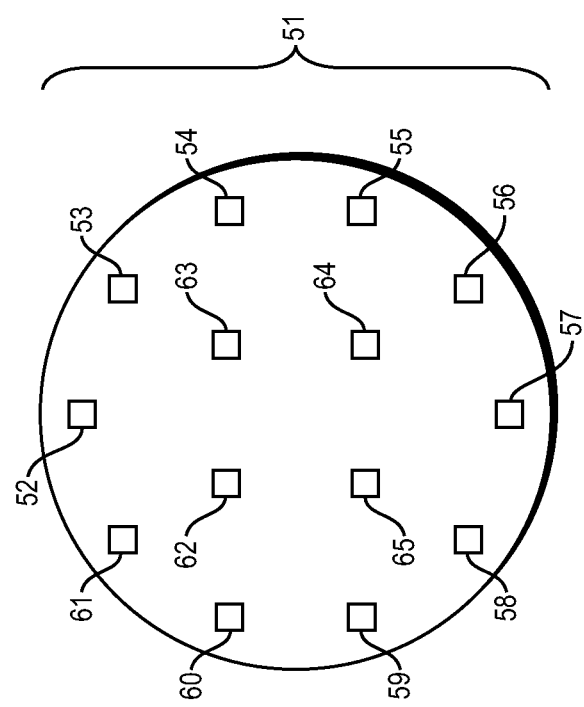
FIG. 5 shows an LED lighting fixture, in an illustrative implementation of this invention.

FIG. 5 is a diagram showing an LED light source 51, in an illustrative implementation of this invention. This light source includes three "white" phosphor-based LEDs (Lumiled® Rebel™ LEDs) 62, 63, 64 for warm, cool and neutral white light, an infrared (IR) LED (Osram® SFH-4232) 65 and ten other LEDs (Lumiled® Rebel™ color LEDs) 52-61 for providing different colors of light. Out of these other ten LEDs, two 56, 61 emit blue light, two 52, 57 emit cyan light, two 53, 58 emit green light, two 54, 59 emit amber light, and two 55, 60 emit red light.

In the example shown in FIG. 5, the light emitted by the LED light source 51 may vary, depending on which of the LEDs are turned on and at what intensity. For example, the LED light source may emit both visible white light and IR light, if the white LEDs 62, 63, 64 and IR LED 65 are turned on. Also, for example, color temperature may be precisely controlled by varying which of the colored LEDs are turned on and at what intensity.

In illustrative implementations of this invention, the LEDs are pulse-width modulated (PWM). In pulse width modulation, power is switched on and off rapidly. By reducing the duty cycle of the LED, the intensity of light emitted by the LED may be reduced.

This invention may be implemented in such a way that the LEDs directly face the scene to be illuminated.

Alternately, this invention may be implemented so that the LEDs face away from the scene, and their light reaches the scene through reflection. For example, LEDs may be positioned so that they face away from the scene to be lit and are covered by a hemisphere that reflects the LED light toward the scene.

Figure 6:
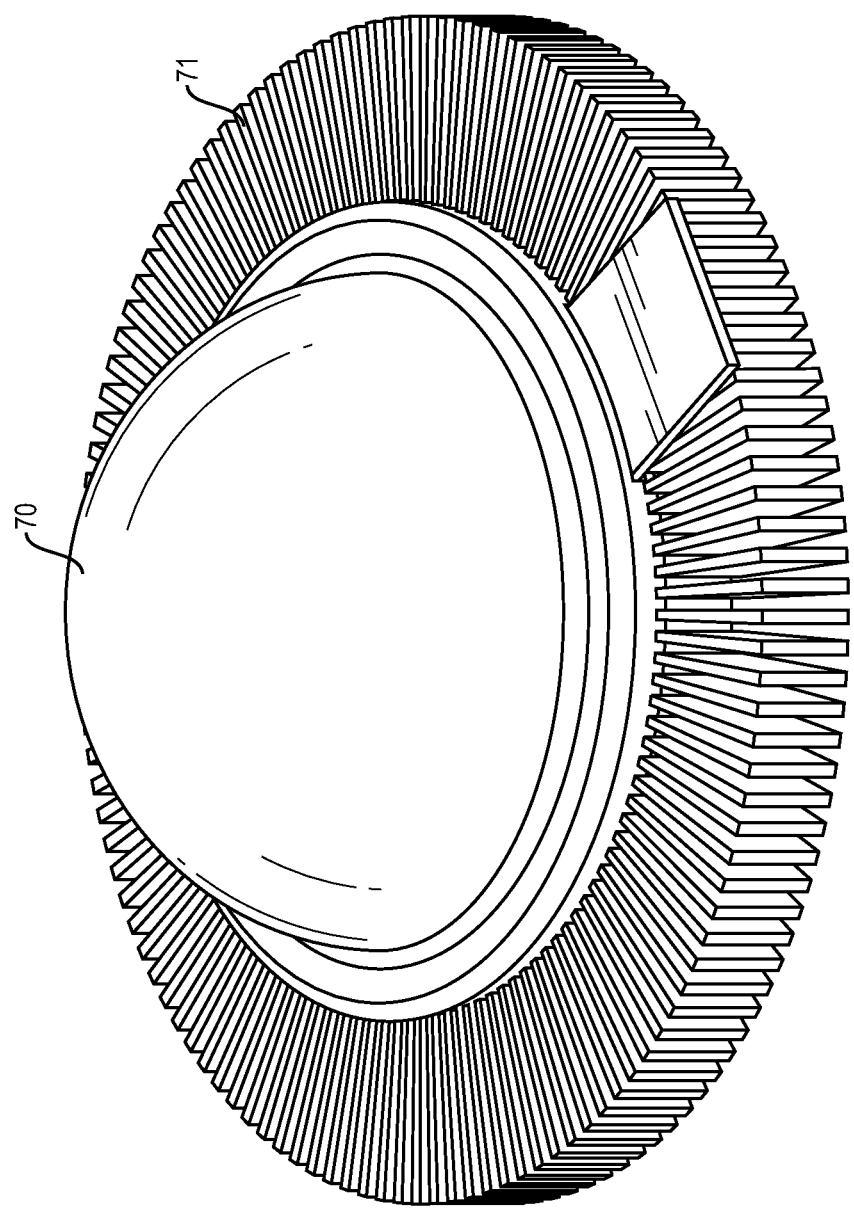
FIG. 6 shows an LED covered by a hemispheric dome, in an illustrative implementation of this invention.

FIG. 6 shows an example of such an alternate implementation. In FIG. 6, an LED light source is covered by a hemispheric dome 8 and surrounded by a heat sink 71. As is well known in the art, a hemispheric dome with a diffuse reflector may be used to reflect light from an array of LED arrays. An advantage of doing so is that it tends to reduce fringing effects at the outer edges of incident light. A disadvantage is that the dome reduces efficacy, due to scattering loss.

Figure 7:
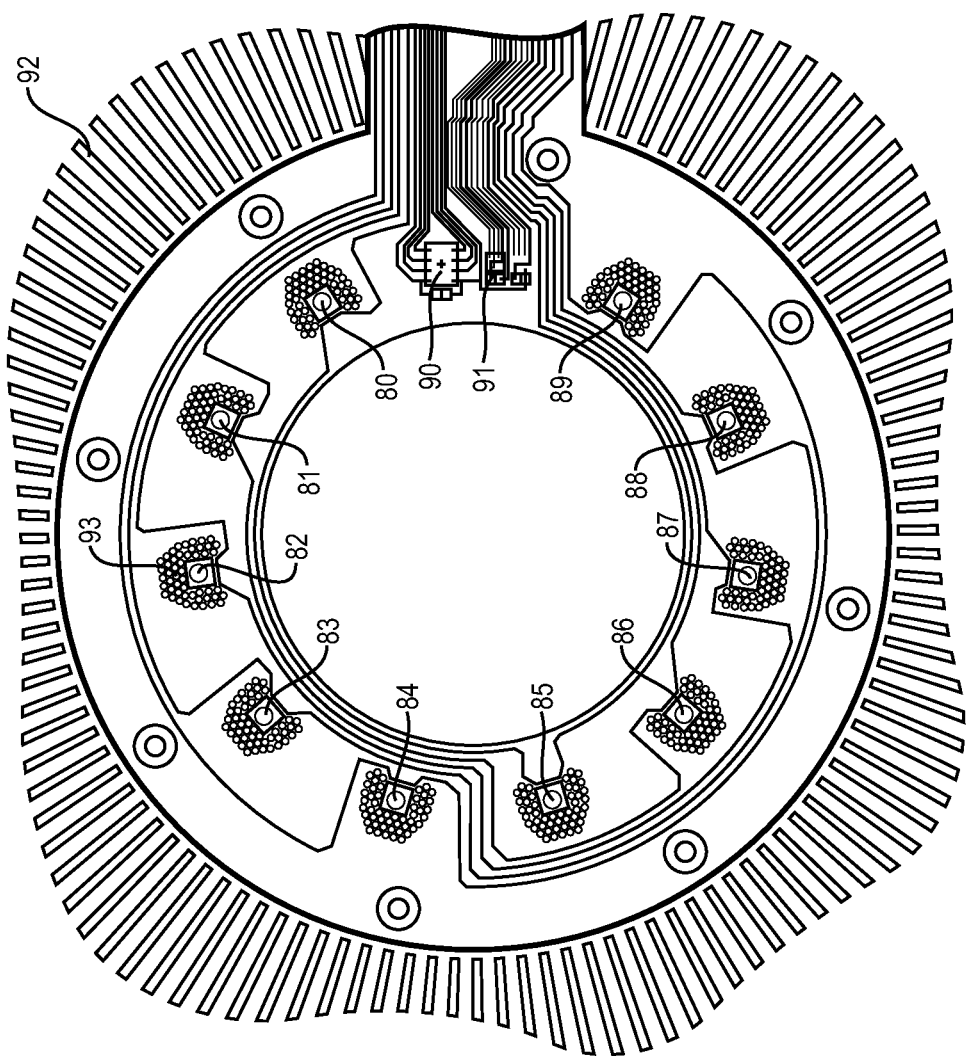
FIG. 7 shows a block diagram of a polychromatic LED ring, in illustrative implementation of this invention.

FIG. 7 is a diagram of a polychromatic LED light source used in a working prototype of this invention. The light source comprises ten LEDs 80-89, mounted on a ring and surrounded by a heat sink 92. Out of these LEDs photodiodes, two emit blue light (dominant wavelength 440 nm to 460 nm), two emit cyan light (dominant wavelength 490 nm to 520 nm), two emit green light (dominant wavelength 520 nm to 550 nm), two emit amber light (dominant wavelength 587.5 nm to 595.4 nm), and two emit red light (dominant wavelength 620.5 nm to 645 nm). The two amber LEDs are phosphor-based. Small holes around each LED (such as those at 93 around LED 82) are drilled through the ring as additional heat sinks. A temperature sensor 91 may be used to estimate LED junction temperature and for closed loop control. In the example shown in FIG. 7, a single pixel color light sensor (TCS3414CS, Taos) 90 measures irradiance using a photodiode array with red, green, blue and clear filters. Data from the sensor may be used for closed loop control of color. This sensor 90 is adapted for use with a hemisphere such as that shown in FIG. 6. Without the hemisphere or other nearby reflector, the angle of incidence would prevent it from accurately measuring the color of the light emitted by the LED array. When a hemisphere is used with the LED ring shown in FIG. 6, light from the LEDs reflects off of the hemisphere and exits the lighting fixture through the empty center of the ring on which the LEDs are mounted.

Figure 8:
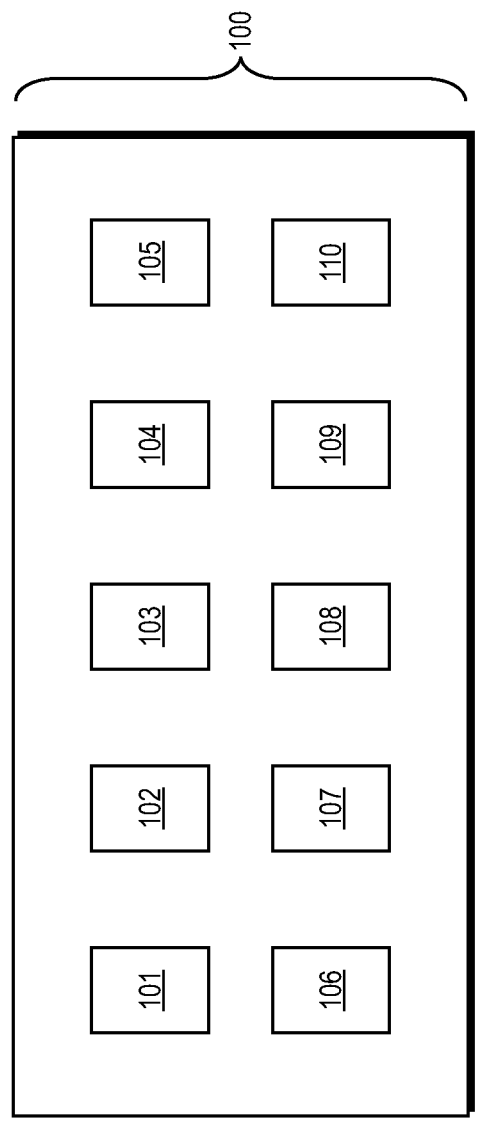
FIG. 8 is a block diagram of a sensor module, in an illustrative implementation of this invention.

FIG. 8 is a block diagram of a sensor unit, or "puck", in an illustrative embodiment of this invention. The sensor unit comprises two analog linear visible light illuminance sensors 101, 102, a digital color and illuminance sensor 103, and an IR light sensor 104. It also comprises a three-axis accelerometer 105, a processor 106, memory 107, a battery power source 108, a transceiver for wireless communication 109, and a human-computer interface (HCI) 110. The accelerometer 106 may be used to detect motion. The IR sensor 105 may be used to measure amplitude (and thereby attenuation) of IR light from an IR light source that is co-located with a visible light source, as described in more detail in the discussion of FIG. 10. Alternately, the IR sensor may be adapted for use as a motion detector. The HCI may enable a user to input preferences regarding level of illumination and color temperature.

Figure 9:
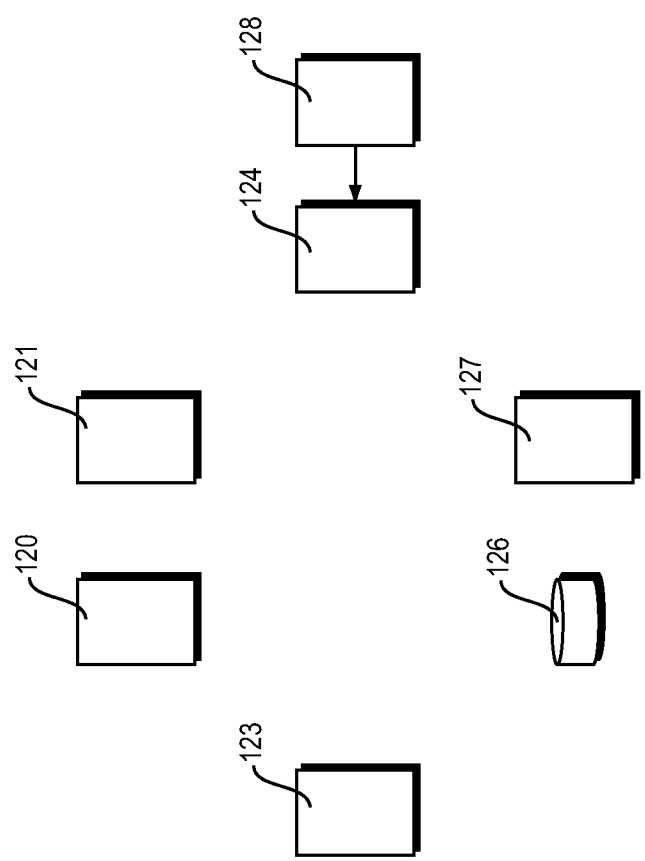
FIG. 9 shows examples of ways in which sensors may be positioned, according to principles of this invention.

The position of the sensors may vary, depending on how this invention is implemented. FIG. 9 shows examples of different sensor positions that may be used for this invention. A sensor unit, or "puck", 126 may be carried by a user and placed in the area that the user desires to be lit.

Alternately, a sensor unit may be housed or co-located with a light source. For example, in FIG. 9, sensors 120 and 121 are mounted on a ceiling or overhead lighting track. Alternately, they could be mounted on walls. Sensors 120 and 121 are each housed with a light source, respectively (light sources not shown). Sensors 120 and 121 measure light reflected to them.

Alternately, a sensor unit may be a camera 123, mounted in a position such as wall or ceiling that is appropriate for capturing an image of a scene. For example, the camera 123 may be a webcam that records images of a scene.

Alternately, a sensor may be continuously or periodically moved to take measurements in many points in an area or volume. For example, a sensor 124 may be continuously or periodically moved by an actuator 128 throughout an area or volume, measuring light at multiple points. These multiple samples may be used to calculate an average or mean for that area or volume. For example, an average light intensity or CRI may be calculated.

In some implementations, a camera 31 is worn by a user and may be aligned to capture images in the user's line of sight. An example of this is shown in FIG. 3.

In a working prototype of this invention: Only LED-based lighting is modulated. Incandescent, fluorescent, and daylight are measured but uncontrolled. The light fixtures are capable of producing both cool and warm whitelight and any arbitrary mix of the two colors. Four commercially available solid-state luminaries are controlled using a UDP (User Datagram Protocol). In addition, white LED fixtures comprising high-brightness warm, and cool (Lumiled® Rebel™ LEDs) and a high-irradiance IR LED (Osram® SFH-4232) communicate using a serial protocol.

In this working prototype, the sensor nodes return illuminance, irradiance, color and accelerometer data back to the control node (a computer) for processing. The intensity is controlled via a link to the artificial light sources. The data link is bidirectional from either the sensor node or the LEDs. A linear program is used to optimize lighting conditions based upon the user's preferences of illuminance, color, and ambient light.

In this working prototype, the sensor board is designed to fit in the case of a readily available and low-cost electronic keychain and measures 34 mm×48 mm. The sensor board includes a 32-bit controller (TI TMS320F28027, 60 MHz clock). The sensor board further comprises of an analog linear visible-light sensor of bandwidth (Intersil ISL29006, bandwidth of 800 Hz), a digital color and illuminance sensor (Taos TCS3414, bandwidth of 50 Hz), and a visible light blocking phototransistor (Panasonic PNZ109CLI, bandwidth of 4 kHz) with a current to voltage converter. The sensor board also features a miniature three-axis analog accelerometer (VTI CMA3000A, bandwidth of 5 Hz) to detect user activity and features three binary control buttons. The sensor node also has 64 megabytes of additional flash memory (Atmel® AT45 DB642D) for storing addresses and additional information required for signal processing. The sensor board communicates with the lighting controller using a wired RS-232 interface.

In this working prototype, the lighting controller initiates the sampling of the opto-electronics when it receives a measurement command from the sensor node. In turn, the lighting controller instructs the sensor board to record up to 512 samples (sampling at 30 kHz) and compute min, max, and mean. This information is then transmitted back to the controller in an iterative fashion for all the light sources. This sensor information is passed into the relevant transfer functions and the linear program is updated and solved. The lighting controller then transmits the new color and intensity values to all the necessary light sources. As a background task, the sensor node samples and populates a buffer containing the min, max, and mean of the three-axis accelerometer at 30 Hz. A buffer containing the illuminance data from the digital color sensor is updated at 4 Hz. The three buttons are polled at 30 Hz. The sensor node interfaces with the real-time lighting controller. The lighting controller is an x86-based architecture running a real-time operating system.

In this working prototype, the lighting controller is running an xPC kernel provided by MATLAB® which allows for dynamic adjustment of controller parameters and data logging without the need to recompile code. All sensors and camera based measurements are calibrated off-line and referenced to absolute units using a spectrometer (Ocean Optics® USB4000). The webcam-based control uses a resolution of 640×480 pixels with a custom exposure time and backlight compensation turned off. The frame rate of the camera is set to 30 Hz. The green channel of the CCD is used to approximate the responsivity of the eye. Similar to the sensor node, the lighting controller processes the camera data and updates the linear program. A proportional and integral (PI) controller is used to track and maintain the illuminance level after the linear program is updated.

This working prototype also includes a webcam. Whereas the sensor board only looks at one specific point, the camera visualizes an entire lighting area. To take advantage of the lighting control methods offered by the camera, a GUI and control software is employed. The GUI contains input elements similar to the sensor board, which are sliders and radio buttons. The sliders allow intensity and color adjustment. The buttons activate detailed monitoring options and initiate the calibration and optimization routine. The GUI also displays the light field, the energy usage, and relative energy savings compared to constant illumination without the optimization. Using the GUI and webcam offers the user another way to set lighting. When the camera-based control is turned on, the user is given the option to draw a polygon around the area of interest and the lighting network provides the correct illumination in that area.

In this working prototype, the GUI serves as both a controller and an information center, capable of rendering the perceived lighting field. For example, when the webcam is turned on and pointed at a desk, an image of the desk captured by the webcam is displayed on the GUI. In that example, the user may select a portion of the desk to be illuminated (by drawing a polygon on the displayed image of the desk shown on the GUI). The network then illuminates the area by looking at an average of pixels from the camera. This form of control is different than using a single point taken with the sensor board.

In exemplary embodiments of this invention, a lighting system is adapted to optimize a particular parameter (such as to minimize power consumption), subject to certain constraints, such as a user's preferences regarding desired level of illumination or desired color temperature. One or more processors run an optimization algorithm to calculate how to adjust the output of the respective light sources in the system in order to achieve this optimization.

For example, a processor may optimize efficacy (that is, maximize the ratio of lumens to power consumed), subject to the constraint that illumination be at least a certain level. The processor determines what combination of outputs of the respective light sources achieves the maximum efficacy—that is, how to adjust the outputs of the respective light sources to achieve this optimization. For example, the intensity of some of the light sources may need to be increased, and the intensity of other light sources decreased.

At any given time, in order to calculate how to adjust the output of the respective light sources to effect an optimization, it is desirable to first determine how much of the total incident intensity at the scene position is attributable to the respective light sources. For example, when calculating how to adjust the respective light sources at any given time, it can be very helpful to estimate how much of the total illuminance at a scene position is already attributable the respective light sources.

Of course, if the target (the scene position to be lit) is changed, so that the distance of the target relative to the light sources changes, then the light incident on the new position will change due to attenuation, and thus the contributions by the respective light sources will change.

By comparing (a) the new measured intensity of light (taken at the new position) from a particular light source to (b) a reference value for that light source (taken at a known distance from the light source), the new distance to the light source may be calculated using the inverse square law.

According to principles of this invention, after a sensor has been moved relative to a light source, constraints or bounds in an optimization algorithm relating to the position of the sensor may be updated by taking a new measure of incident intensity at the new position, and calculating attenuation (by comparing that measurement to a reference value for incident intensity at a known distance from the light source). The inverse square law may then be used to update an optimization algorithm (e.g., by updating an element of a matrix or vector that defines a constraint or objective function in linear programming). This approach may dramatically reduce computational complexity, and thereby facilitate real time response of the system.

In this "attenuation" approach, reference values calculated in a calibration step may be used when initially setting up an optimization program (for example, as elements in a matrix or vector that defines the constraints or objective function, if linear programming is used for optimization).

Of course, an optimization algorithm can be updated by other means that do not require distance to be calculated and do not use the inverse square law. Instead, for example, a coefficient matrix that represents lux values may be populated with data measured by the sensor. A disadvantage of this alternate approach is that it may require sampling of all unique LED samples of the system, and may thereby slow computation speeds.

This invention may be implemented in such a way that one or more penalization factors are added to a constrained optimization. For example, the optimization program may be formulated with one or more additional nonlinear or piecewise parameters to penalize the objective function.

According to principles of this invention, different approaches may be used to determine the contribution of respective light sources to total incident illuminance at a sensor position. Four of such approaches (to determine the contributions of the respective light sources) are described below.

In the first approach, each LED light fixture includes both visible light LEDs and infrared (IR) light LEDs.

An illustrative example of this first approach, IR irradiance may be measured and used to estimate visible light illuminance, as follows: In a calibration step, both incident IR irradiance and incident visible light illuminance from a light source are measured at different distances from that light source. These measurements are used to determine a linear fit between the IR irradiance and visible light illuminance at different distances. A single linear fit (between IR irradiance and visible light illumination) may be used for entire system, taking into account stated manufacturer tolerances (in order to budget for a so-called worst case scenario).

Measurements taken in this calibration step at a particular position may be used as arbitrary setpoints to set initial values used in an optimization algorithm. For example, these calibration measurements of visible light illuminance may be used as matrix or vector elements when initially specifying constraints or an objective function for use in linear programming.

If a position of the target lighting area changes (e.g., if a user moves a sensor "puck" to a new location), then a new measurement is taken of IR irradiance from a LED lighting source incident at the new target. From this IR irradiance measurement, the visible light incident at the target is estimated, based on the linear fit determined earlier. This new measurement is repeated for each of the LED light sources, one light source at a time. The new estimates of visible light irradiance from the respective light sources at the new target position are used to update the optimization algorithm.

An advantage of this first approach is that the new measurements are not visible to a user. A disadvantage is that this first approach requires IR emitters and at least one IR sensor, in addition to visible light LEDs and sensor(s).

Figure 10:
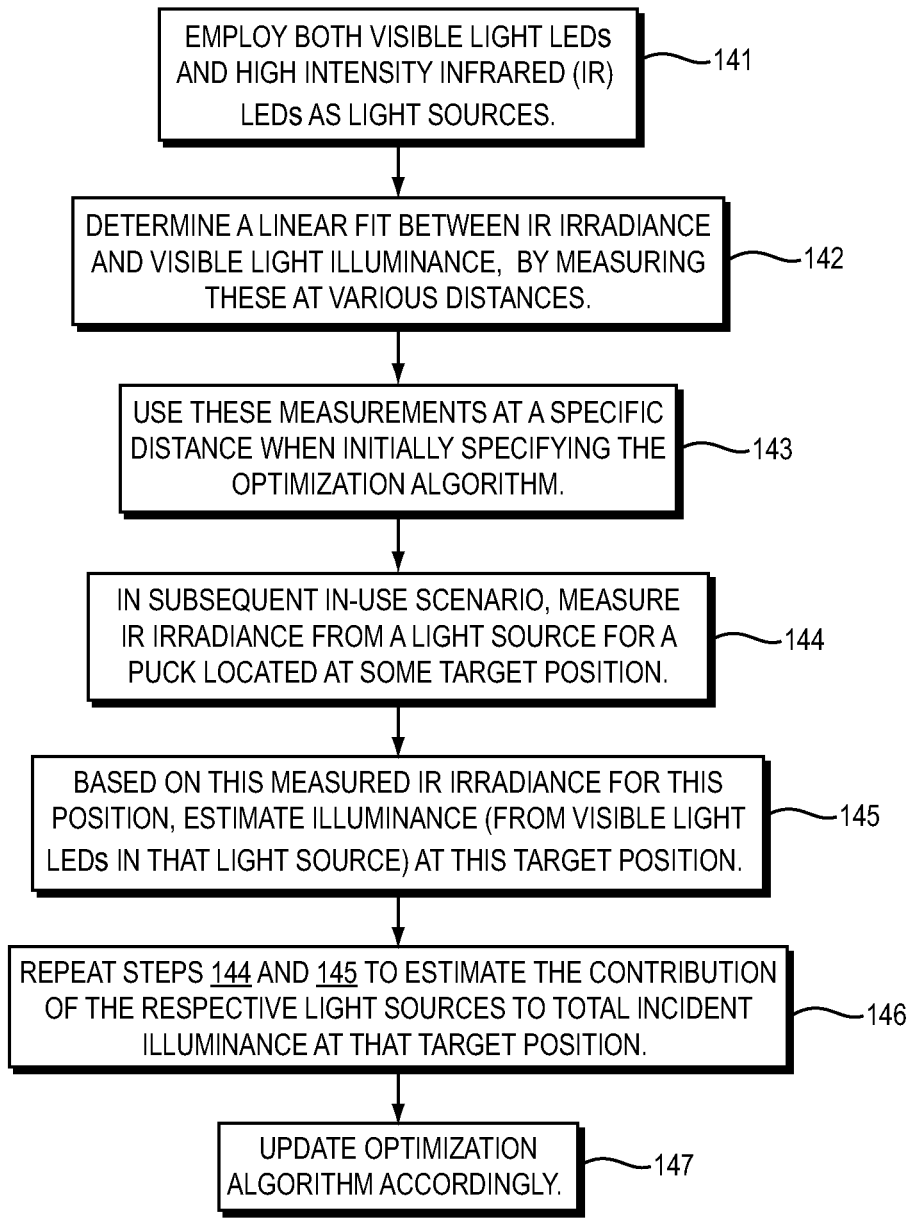
FIG. 10 is a flow chart that illustrates IR irradiance being measured in order to estimate visible light illuminance, in an illustrative implementation of this invention.

FIG. 10 is a flow chart that illustrates an example of this first approach, in an illustrative implementation of this invention. The steps 141-147 in this example include: (a) using both visible light LEDs and IR LED in a light source 141; (b) determining a linear fit between IR irradiance and visible light illuminance 142; (c) using reference measurements of IR irradiance and visible light illuminance when initially specifying an optimization algorithm 143; (d) in subsequent in-use scenario, measuring IR irradiance from light source at some target position 144; (e) based on this measured IR irradiance, estimating visible light illuminance from that light source incident at that target position 145; (f) repeating steps 144 and 145 to estimate the contribution of the respective light sources to total illuminance at that position 146, and (g) updating optimization algorithm accordingly 147.

In the second approach, light emitted by an LED light source includes a high frequency carrier wave. At least one of the LEDs in each LED light fixture has an LED with a unique carrier frequency that allows light from that LED light fixture to be uniquely identified (within the lighting system).

Here is illustrative example of this second approach: An LED light sourced emits pulse-width modulated light. That PWM light includes a carrier frequency. The carrier frequency is much higher than the PWM fundamental frequency and uniquely identifies the PWM as being from that particular LED light fixture. In a calibration step, the amplitude of the carrier wave from a particular light source is measured. This calibration step is performed for each of the LED light sources, respectively. Measurements taken in this calibration step at a particular position are used as arbitrary setpoints to set initial values used in an optimization algorithm. For example, the RMS amplitudes of the carrier waves of the respective light LED light sources measured at this calibration position may be used as matrix elements when initially specifying an objective function for optimization by linear programming.

If a position of the target lighting area changes (e.g., if a user moves a sensor "puck" to a new location), then a new measurement is taken of the amplitude of the carrier wave from a particular LED light source incident at the new position. This is repeated for each of the LED light sources, one light source at a time. These new amplitude measurements are used to update the optimization algorithm.

In this example of the second approach, the carrier is mixed with the PWM brightness control and sent to the LED driver. On the receiver side, a high frequency bandpass filter (set to detect different carrier frequencies) strips the carrier from the transmitted visible light signal. The carrier frequencies of the LEDs are either already known, or are detected in a calibration stage, or can be assigned by a lighting controller during operation. Thus, in an in-use scenario, the filters may be tuned to detect those specific carrier frequencies. The filters may be implemented as FIR or IIR type filters with fixed point or floating point coefficients. The filter coefficients can be set dynamically to tune for various carrier frequencies.

Figure 11:
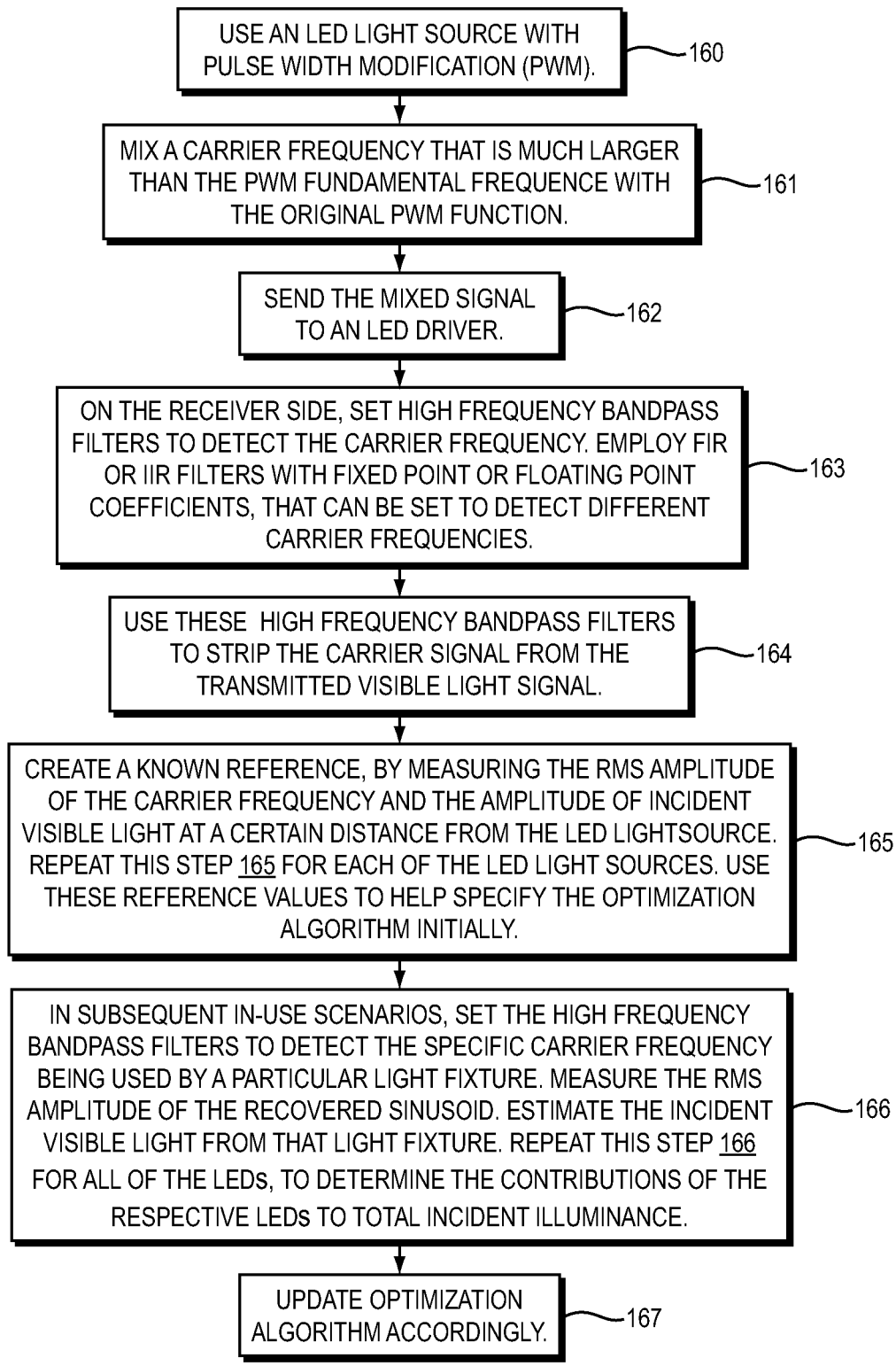
FIG. 11 is a flow chart that illustrates the use of high frequency carrier waves mixed with PMW signals, in an illustrative implementation of this invention.

FIG. 11 is a flow chart that illustrates an example of this second approach, in an illustrative implementation of this invention. The steps include: (a) using PWM light 160; (b) mixing a high frequency carrier frequency with the original PWM function 161, sending the mixed signal to an LED driver 162; (c) on the receiver side, using high frequency bandpass filters to detect the carrier frequency, and using FIR and IIR filters that can be set to detect different frequencies 163; (d) stripping out the carrier signal 164; (e) creating reference values by measuring the carrier frequency and amplitude of incident visible light for the each respective light source at a certain distance and using those reference values when initially specifying an optimization algorithm 165; (f) in subsequent in-use scenarios, setting the filters to detect the carrier frequency being used and measuring amplitude of the recovered carrier signal, repeating for each of the light sources, using these carrier signal amplitudes to estimate visible light amplitude to determine the contributions of the respective LEDs to the total incident illuminance measured at the sensor position 168; and (g) updating an optimization algorithm accordingly 169.

In the third approach, measurements of the light intensity of PWM light are taken by a sensor located at a target position in the scene, as the emitted light intensity of LED light sources are varied by known percentages.

Figure 12:
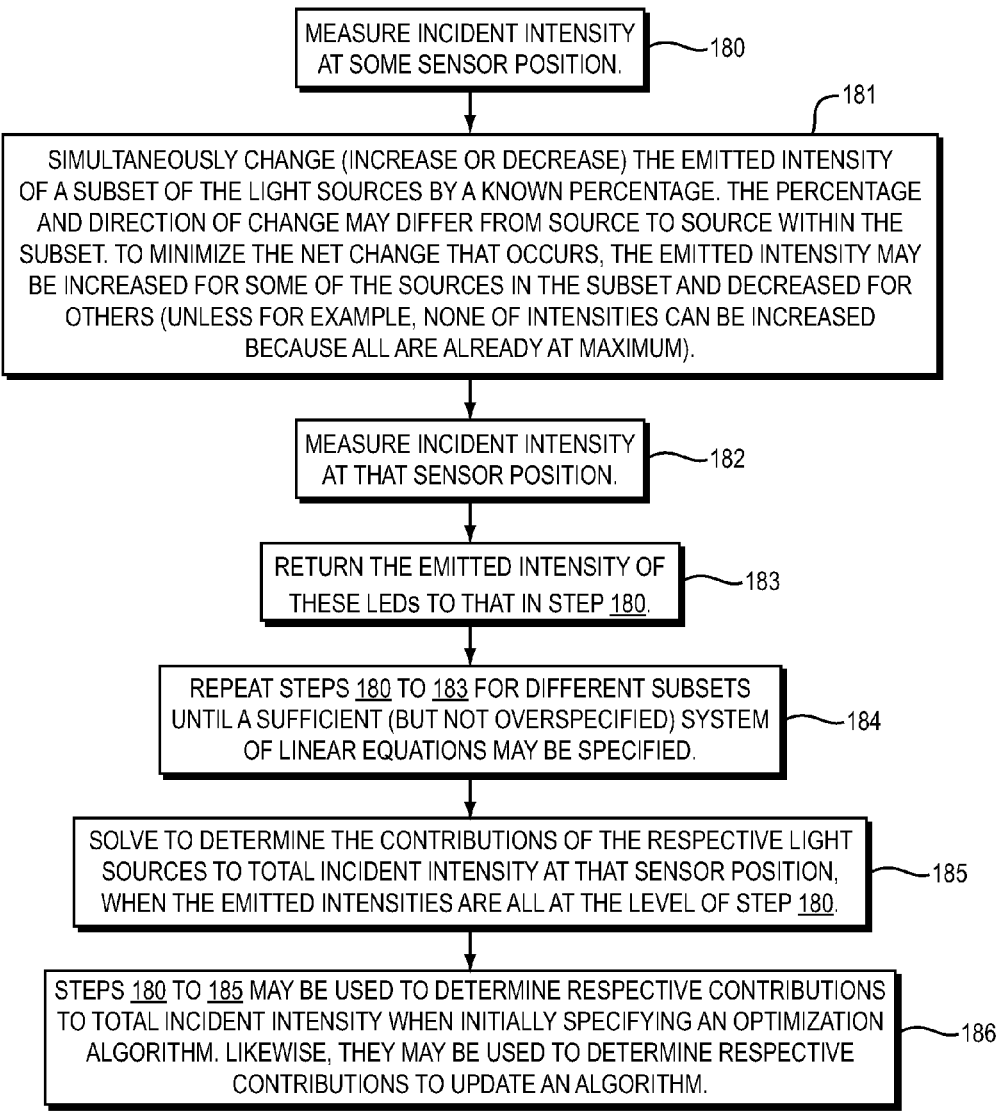
FIG. 12 is a flow chart that illustrates emitted light intensity of LED light sources being varied by known percentages, in an illustrative implementation of this invention.

An illustrative implementation of this third approach is described in the flow chart in FIG. 12. The steps comprising this implementation are as follows: Measure incident intensity at some sensor position 180. Simultaneously change (increase or decrease) the emitted intensity of a subset of the light sources by a known percentage. The percentage and direction of change may differ from source to source within the subset. To minimize the net change that occurs in this step, the emitted intensity may be increased for some of the sources in the subset and decreased for others in the subset (unless for example, none of intensities can be increased because all are already at maximum) 181. Measure incident intensity at that sensor position 182. Return the emitted intensity of these LEDs to that in step 180 (the first step) 183. Repeat steps 180 to 183 for different subsets until a sufficient (but not overspecified) system of linear equations may be specified 184. Solve to determine the contributions of the respective light sources to total incident intensity at that sensor position, when the emitted intensities are all at the level of step 180 (the first step) 185. Steps 180 to 185 may be used to determine respective contributions of respective light sources to total incident intensity at a specified location when initially specifying an optimization algorithm. Likewise, they may be used to determine respective contributions to update an optimization algorithm 186.

In another variation of the third approach, all of the LEDs are turned off. A reference measure of incident illuminance is taken. Then one of the LEDs is turned on, and measurements of incident illumination are taken. The LED is turned back on, and the process is repeated for each of the LEDs, turning them on and off one at a time. The resulting data is stored in a buffer and sampled to calculate min/max values. The min gives the ambient light level. The max less the min (during a period in which only one LED is turned on) gives the contribution of that LED to the incident total illuminance. Another variation of the third approach is similar, except that all of the LEDs are turned on, then the LEDs are turned off and on, one at a time.

In the fourth approach, sensors are housed with each of the LED light sources, respectively, and measure reflected light from the scene. The contributions of the respective light sources are calculated by superposition.

Here is illustrative example of this fourth approach: LED light sources are mounted on a ceiling. A sensor is positioned in or immediately adjacent to each of these light sources. These sensors measure light reflected from the scene. Each of these sensors captures a light map of the scene. These light maps may be superimposed to create an illuminance model of the lighting space, assuming the system is linear. From this illuminance model, the contribution of each of the respective LED light sources to the scene may be estimated. This estimation may be performed by using the measured reflected light and a CCD transfer function. (The CCD transfer function is between the camera and a known reference source and is created in a calibration step). This fourth approach may be used to initially specify an optimization algorithm, and to update it when the target position in a scene changes.

Figure 13:
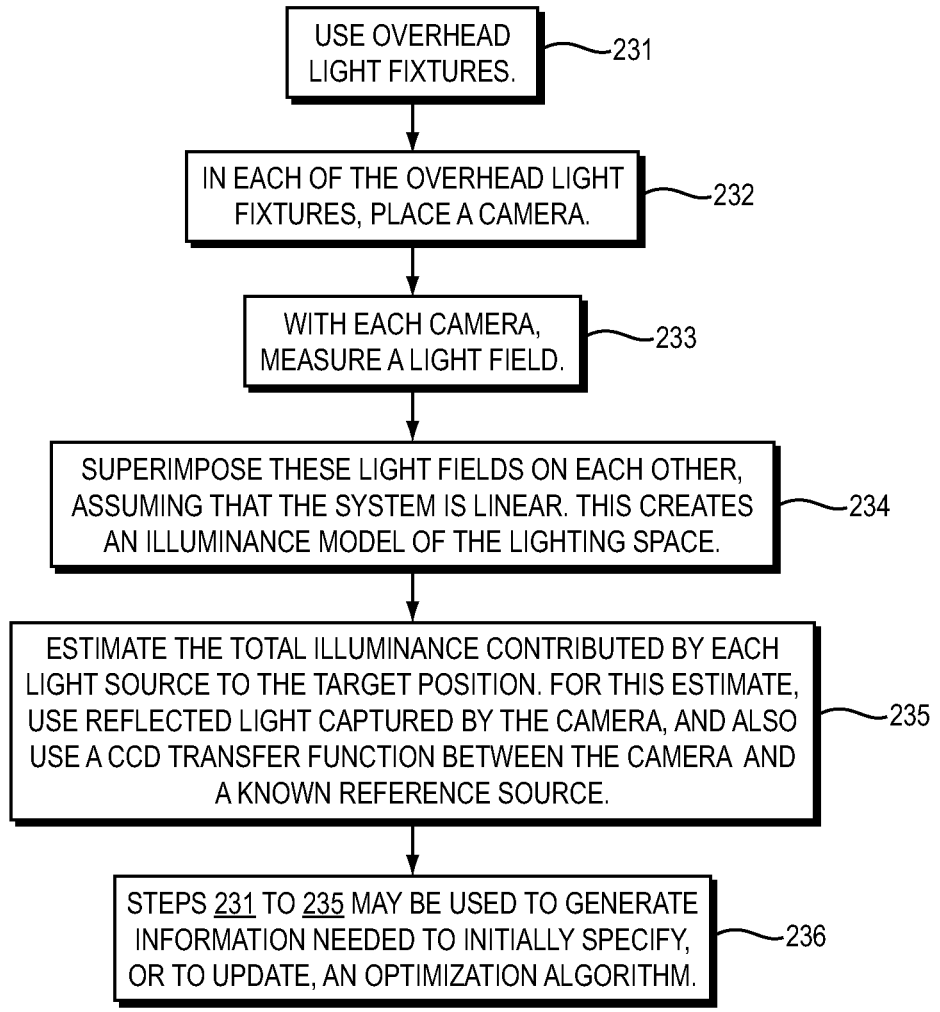
FIG. 13 is a flow chart that illustrates superposition of reflected light maps, in an illustrative implementation of this invention.

FIG. 13 is a flow chart that illustrates an example of this first approach, in an illustrative implementation of this invention. The steps in this flowchart include using overhead light fixtures 231, placing a camera in each fixture 232, measuring a light field with each camera 233, superimposing these light fields 234, and estimating the contributions of the respective light sources to total incident illuminance at the target position (using the reflected light captured by the camera and a CCD transfer function between the camera and a known reference source) 235, and using the resulting information for initializing or updating optimization algorithms 236.

As noted above, in illustrative implementations of this invention, the lighting system may optimize a parameter (such as power consumption or efficacy), subject to certain constraints (such as a user's desired level of illuminance).

Linear programming with linear inequality (or linear equality constraints) may be used for the optimization program. The chief advantage of using a linear system for optimization is computational ease. However, a linear approach to optimization fails to take into account the nonlinearity of calculating the color rendering index, which can lead to chromatically inaccurate white light with a low color rendering index. This is not desirable.

Alternately, nonlinear optimization algorithms may be used. For example, this invention may be implemented in such a way that pattern search or mesh adaptive search is used for optimization. Or, for example, other direct search methods may be used.

In exemplary implementations of this invention, the optimization algorithm may be updated in real time, so that control instructions for the lighting sources may be modified in real time. This is highly advantageous, giving the system flexibility to adapt to changing conditions. In exemplary implementations, updating may occur in real time in response to a variety of triggering events. For example, events that may trigger such a real time update may include: (a) a change in the position of a sensor "puck" (in a context where user places the sensor at the target position to be lit), (b) a change in ambient light level, (c) a change in an optimization constraint (e.g., a user inputs a changed preference regarding illuminance level), or (d) a change in the position of a scene captured by a camera of other light sensor, in a context where a user intends that all or a portion of the captured scene indicate the target position to be lit (e.g. where a user wears a miniature camera aligned along the user's line of sight and intends that the central area of the scene along that line of sight should illuminated).

Figure 14:
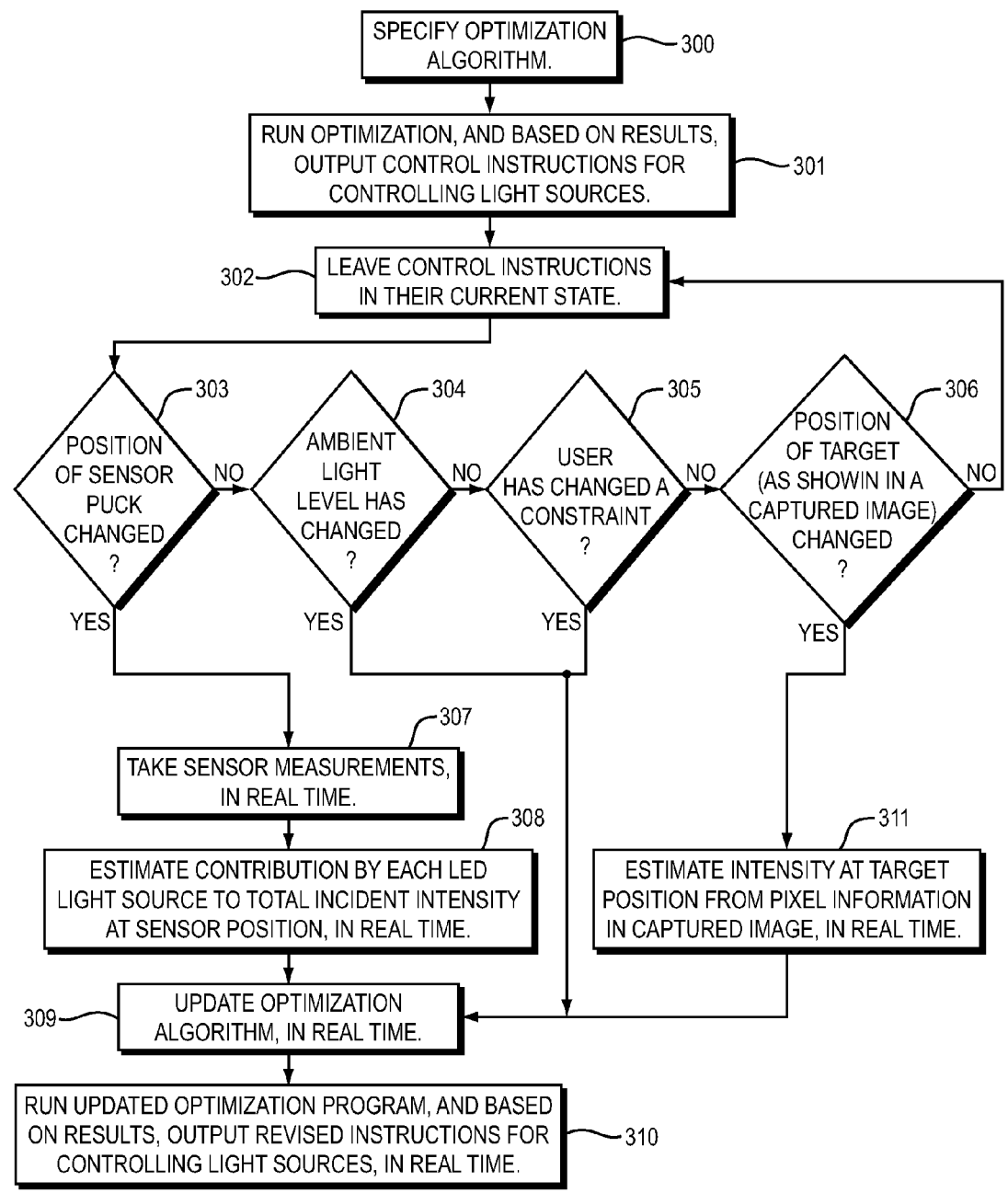
FIG. 14 is a flow chart that illustrates an optimization algorithm and control signals for lighting fixtures being updated in real time, in an illustrative implementation of this invention.

FIG. 14 is a flow chart that illustrates the process of real time updating, in an illustrative implementation of this invention. In this example, the process comprises the following steps. Specify an optimization algorithm 300, using data regarding the contributions by the respective LED light sources to total incident illuminance in the target area, as well as user-specified (or default) preferences regarding constraints (such as level of illuminance or color temperature). Run the optimization program, and based on the results, output control instructions for controlling light sources. 301. Very frequently monitor to determine whether a light sensor "puck" (which the user places to specify the target area to be lit) has moved 303, whether ambient light level has changed 304, whether the user has changed a constraint 305, or whether the position of a reflected scene captured by a light sensor or camera (which scene a user intends to specify a target area to be lit) has changed. As long as the answer to all of these questions is no, leave the control instructions in their current state. 302. If the sensor has moved to a new target position, take new sensor measurements at the new target position 307, make new estimates of the contribution of the respective light sources to total incident illuminance at the new target position 308, and update the optimization algorithm 309, all in real time. If the ambient light level or a constraint (such as desired illuminance) has changed, update the optimization algorithm 309. If the position of a scene captured by a camera (or other light sensor) changes (in a context where a user intends that all or a portion of the captured scene indicate the target position to be lit), then estimate intensity at target position from pixel information in the captured image 311, and update the optimization algorithm 309, all in real time. Run the updated optimization algorithm, and based on results, output revised control instructions for the lighting fixtures, in real time 310.

Figure 15:
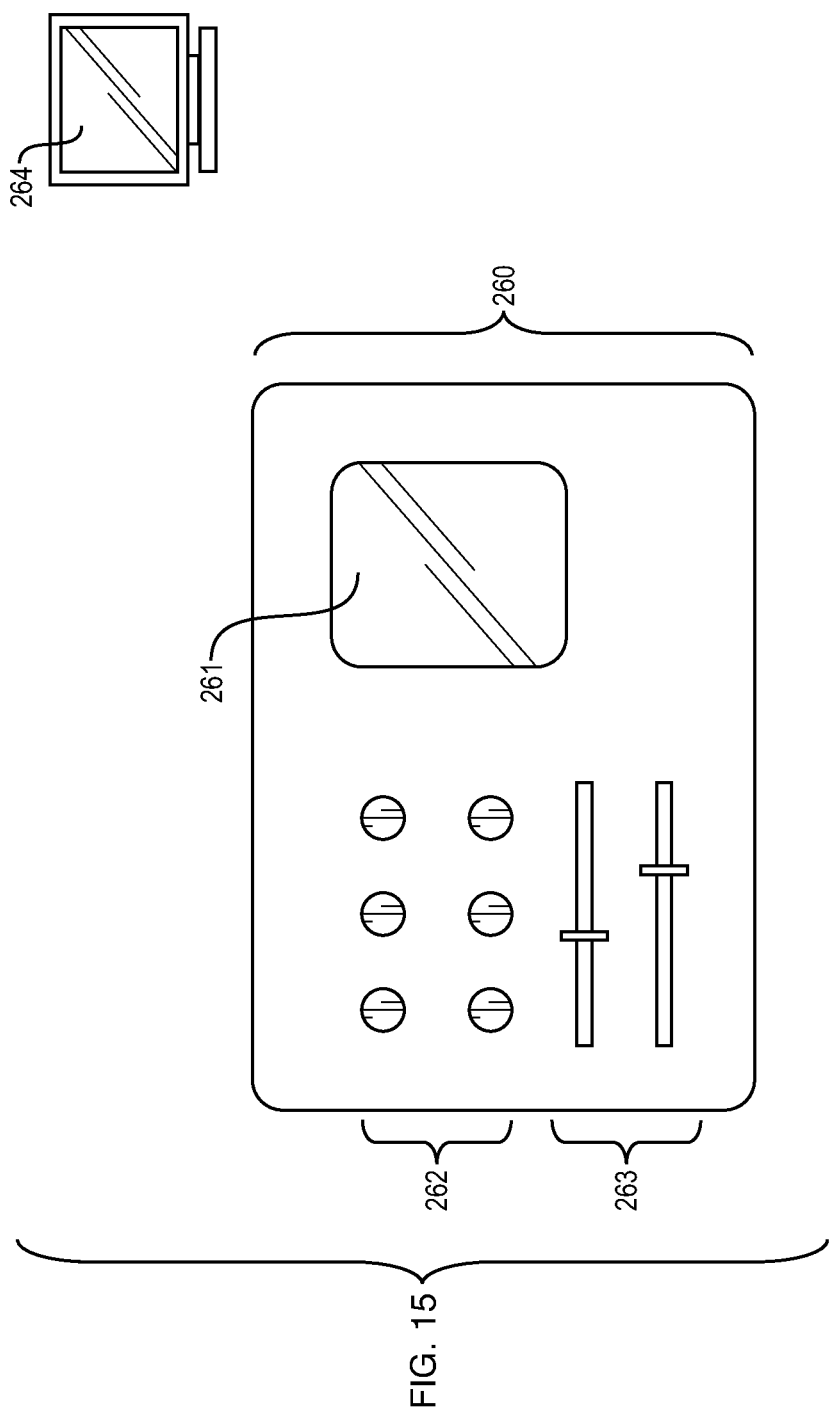
FIG. 15 is a block diagram of human-computer interfaces, in an illustrative embodiment of this invention.

Human intent may be inputted into the system in various ways, depending on the particular implementation. FIG. 15 shows two HCIs, in an illustrative implementation of this invention. A "puck" (260) includes not only sensors 261 but also six control buttons 262 and two slider controls 263 that a user may use to input intent. For example, the upper slider control may be used to set a desired illuminance level and the lower slider control may be used to set a desired color temperature. Also, a user may employ a graphical user interface 264 on a computer screen in order to input intent.

For clarity's sake, a few definitions:

"PWM" means pulse-width modulated.

As used herein, the term "intensity" means light intensity, and is construed broadly. For example, the term "intensity" includes radiant intensity (W/sr), irradiance (W/m$^2$), radiance (W×sr$^{-1}$×m$^{-2}$), luminous intensity (lm/sr or cd), luminance (lm×sr$^{-1}$×m$^{-2}$, or cd×m$^{-2}$), illuminance (lm×m$^{-2}$), luminous emittance and luminous exitance.

As used herein, "light" refers broadly to electromagnetic radiation of any frequency. It is not limited to visible light.

"Efficacy" means the ratio of luminous flux (in lumens) produced by a light source to the power (in watts) consumed to produce it.

This invention may be implemented in many ways, in addition to those described above. For example, different types and combinations of LEDs may be used, different types of light, motion and temperature sensors may be used, and different optimization algorithms may be employed.

This invention may be implemented as a lighting control system comprising, in combination: (a) at least one light sensor for measuring intensity of light, wherein at least part of said light is from a plurality of light sources, and (b) at least one processor for: (I) calculating the amount of said measured light intensity contributed by the respective sources, (II) calculating for each of said sources, respectively, the attenuation of said contributed intensity due to distance between sensor and source, (III) calculating the light intensity of each of said sources, respectively, needed to optimize an attribute of said plurality of sources, subject to at least one linear or non-linear constraint, and (IV) outputting instructions for controlling said sources. Furthermore: (1) said system may be adapted to update said optimization calculations and said outputted instructions in real time, in response to said sensor being repositioned or to at least one said constraint being changed by input from a user; (2) at least one of said sensors may be an infrared sensor for measuring infrared light, and least one said processor may calculate the intensity of visible light incident on said infrared sensor, based on said measurements of infrared light, (3) at least one of said sensors may be adapted to measure the amplitude of a carrier frequency, which carrier frequency comprises part of the PWM light emitted by one of said sources, is higher than the fundamental frequency of that PWM light, and uniquely identifies that source, and (4) at least one said processor may be adapted to calculate attenuation of said measured amplitude due to distance between sensor and source, (4) at least one said processor may be adapted to output instructions for causing a substantially simultaneous change (increase or decrease) in the emitted intensity of a plurality of light sources in said system, which simultaneous change is by a known percentage, in such a way that emitted intensity is increased for some of the plurality and decreased for others in the plurality, and at least one said processor may be adapted to calculate the respective contributions of light sources to total incident intensity at a sensor; (5) said increases or decreases in emitted intensity may be achieved, at least in part, by altering the duty cycle of a PWM light source, (6) at least one actuator may be adapted to move at least one said sensor continuously or periodically through or in an area or volume, (7) at least one said processor may be adapted to calculate attenuation in received signal due to a change in sensor position, and to use said calculated attenuation in calculations that update a constraint or objective function of an optimization algorithm.

This invention may be implemented as a lighting system comprising, in combination: (a) a plurality of PWM illumination sources, (b) at least one light sensor for measuring intensity of light, at least part of said light being from said plurality of illumination sources, and (c) at least one processor for: (I) calculating the amount of light intensity contributed by the respective said sources at a point of incidence, (II) calculating the light intensity of each of said sources, respectively, needed to optimize an attribute of said system, subject to at least one linear or non-linear constraint, and (III) outputting instructions for controlling said sources, wherein said system is adapted to update said optimization calculations and said outputted instructions in real time, in response to said sensor being repositioned or to at least one said constraint being changed by input from a user. Furthermore: (1) said processor may be adapted to process measurements of primarily reflected light in order to update a constraint or objective function in a linear computing optimization, (2) at least one of said constraints may be a value that represents a user preference regarding lighting intensity, (3) at least one of said constraints may be a value that represents a user preference regarding color, (4) at least some of PWM lighting sources may comprise a polychromatic set of LED active emitters, (5) said system may further comprise a plurality of light sensors, each of which sensors is substantially co-located with one of said PWM sources, wherein at least one said processor is adapted to process data regarding light intensity measurements taken by said plurality of sensors, to calculate the respective light maps for said sources, to superimpose said light maps on each other to calculate a model of the lighting space, and to calculate light intensity contributed by the respective sources at a point of incidence, (6) at least one said sensor may be adapted for being carried or worn by a human user, (7) at least one said sensor may be housed with at least one infrared motion detection sensor or with at least one accelerometer, (8) said attribute for optimization may be efficacy or CRI, and (9) at least one actuator may be adapted to move at least one said sensor continuously or periodically through or in an area or volume, This invention may implemented as a method for controlling lights comprising the following steps, in combination: (a) using at least one sensor to measure incident intensity of light, and (b) using one or more processors: (I) to calculate, for each of a plurality of PWM light sources respectively, the amount of said incident intensity that is attributable to said respective source, (II) to calculate for each of said sources, respectively, the attenuation of said contributed intensity due to distance between sensor and point of measurement, (III) to calculate the light intensity of each of said sources, respectively, needed to minimize the total power absorbed by (or total current through) said plurality of sources, subject to one or more linear or non-linear constraints, and (IV) to output instructions for controlling said sources. Furthermore, said method may further comprise the step of changing at least one of said constraints in response to data inputted by a user.

Conclusion

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. A lighting control system comprising, in combination:
   (a) a light sensor; and
   (b) one or more processors; wherein the one or more processors are configured to:
      (i) to optimize a parameter regarding lighting,
      (ii) to calculate how to adjust outputs of respective light sources to maximize or minimize the parameter,
      (iii) to update a constraint in an optimization algorithm, after the sensor has been moved relative to a light source to a new position, by (A) taking a measurement of incident intensity at the new position, (B) calculating attenuation, by comparing the measurement to a reference value at a known distance from the light source, and (C) using the inverse square law to calculate a change in the constraint of the optimization algorithm.

2. The system of claim 1, wherein the system is further adapted to update outputted control instructions in real time, in response to a constraint of the optimization algorithm being changed by input from a user.

3. The system of claim 1, wherein:
   (a) the sensor is configured to take measurements of intensity of infrared light from a light source incident at a target position; and
   (b) the one or more processors are configured
      (i) to calculate, based on the measurements, intensity of visible light from the light source incident at the target position, and
      (ii) to calculate contribution by the light source to total illuminance at the target position, which total illuminance is from a plurality of light sources.

4. The system of claim 1, wherein
   a) the sensor is configured to measure amplitude of a carrier frequency at a sensor position, which carrier frequency comprises part of PWM light emitted by a light source, is higher than the fundamental frequency of the PWM light, and uniquely identifies the light source; and
   (b) the one or more processors are configured
      (i) to estimate, based on the amplitude of the carrier frequency, visible light amplitude, and
      (ii) to determine contribution of the light source to total illuminance at the sensor position, which total illuminance is from a plurality of light sources.

5. The lighting control system of claim 1, wherein the lighting control system is configured:
   (5a) to measure incident intensity at a sensor position during an initial lighting state;
   (5b) to output instructions for causing a change in emitted intensity of a plurality of light sources, which change is to a new lighting state and is by a known percentage, in such a way that emitted intensity is increased for a first subset of the plurality of the light sources and decreased for a second subset of the plurality of the light sources;
   (5c) to measure incident intensity at the sensor position during the new lighting state;
   (5d) to repeat steps (5a), (5b) and (5c) for different subsets of the plurality of the light sources, until a system of linear equations is specified, and
   (5e) to solve the system of linear equations to determine contributions of respective light sources, out of the plurality, to a total incident intensity at the sensor position.

6. The system of claim 1, wherein the sensor is configured to be carried by a human user.

7. The system of claim 1, wherein at least one actuator is adapted to move at least one said sensor continuously or periodically through or in an area or volume.

8. The system of claim 1, wherein the parameter comprises efficacy or CRI.

9. A lighting system comprising, in combination:
   (a) a plurality of PWM illumination sources;
   (b) a light sensor for measuring intensity of light; and
   (c) at least one processor for
      (i) calculating light intensity contributed by respective illumination sources, out of a plurality of illumination sources, at a point of incidence;
      (ii) calculating the light intensity of each of the respective illumination sources needed to optimize an attribute of said system, subject to one or more constraints; and
      (iii) outputting instructions for controlling the illumination sources;
   wherein the system is adapted (1) to update the optimization calculations and the outputted instructions in real time, in response to the light sensor being repositioned relative to the illumination sources, and (2) to update the optimization calculations and the outputted instructions in real time, in response to a specified constraint, out of the one or more constraints, being changed by input from a user.

10. The system of claim 9, wherein the at least one processor is adapted to process measurements of primarily reflected light in order to update a constraint or objective function in a linear computing optimization.

11. The system of claim 9, wherein the specified constraint is a value that represents a user preference regarding lighting intensity.

12. The system of claim 9, wherein the specified constraint is a value that represents a user preference regarding color.

13. The system of claim 9, wherein at least some of the PWM illumination sources comprise a polychromatic set of LED active emitters.

14. The system of claim 9, wherein:
(a) the light sensor is one of a plurality of light sensors;
(b) the system further comprises the plurality of light sensors;
(c) each respective sensor, out of the plurality of sensors, is substantially co-located with one of the illumination sources; and the at least one processor is adapted
    (i) to process data regarding light intensity measurements taken by the plurality of sensors,
    (ii) to calculate respective light maps for the illumination sources,
    (iii) to superimpose the light maps on each other to calculate a model of a lighting space, and
    (iv) to calculate light intensity contributed by the respective illumination sources at a point of incidence.

15. The system of claim 9, wherein the sensor is adapted for being carried or worn by a human user.

16. The system of claim 9, wherein the sensor is housed with at least one infrared motion detection sensor or with at least one accelerometer.

17. The system of claim 9, wherein the attribute that is optimized is efficacy or CRI.

18. The system of claim 9, wherein at least one actuator is adapted to move the sensor continuously or periodically through or in an area or volume.

19. A method for controlling lights comprising the following steps, in combination:
(a) using a light sensor to measure intensity of light; and
(b) using at least one processor
    (i) to calculate light intensity contributed by respective light sources, out of a plurality of light sources, at a point of incidence,
    (ii) to calculate light intensity of each of the respective light sources needed to optimize an attribute of said system, subject to one or more constraints,
    (iii) to output instructions for controlling the light sources, and
    (iv) to update the optimization calculations and the outputted instructions in real time, in response to the light sensor being repositioned relative to the illumination sources.

20. The method of claim 19, further comprising the step of changing, in real time, a specified constraint out of the one or more constraints in response to input from a user.

* * * * *